United States Patent
Yoshida (10) Patent No.: US 8,273,188 B2
(45) Date of Patent: Sep. 25, 2012

(54) CONSTANT VELOCITY UNIVERSAL JOINT COMPONENT AND MANUFACTURING METHOD THEREOF

(75) Inventor: Kazuhiko Yoshida, Iwata (JP)

(73) Assignee: NTN Corporation, Osaka (JP)

( * ) Notice: Subject to any disclaimer, the term of this patent is extended or adjusted under 35 U.S.C. 154(b) by 416 days.

(21) Appl. No.: 12/525,956

(22) PCT Filed: Jan. 28, 2008

(86) PCT No.: PCT/JP2008/051230
§ 371 (c)(1),
(2), (4) Date: Aug. 5, 2009

(87) PCT Pub. No.: WO2008/105209
PCT Pub. Date: Sep. 4, 2008

(65) Prior Publication Data
US 2010/0323803 A1    Dec. 23, 2010

(30) Foreign Application Priority Data
Feb. 27, 2007  (JP) ................... 2007-047116

(51) Int. Cl.
*C23C 8/22* (2006.01)
(52) U.S. Cl. ....................... 148/226; 464/906
(58) Field of Classification Search ........ 464/140–146, 464/902, 904–906; 148/226, 229, 220; 29/898.067
See application file for complete search history.

(56) References Cited

U.S. PATENT DOCUMENTS

| 7,052,400 B2 * | 5/2006 | Kura et al. ............... 464/905 |
| 2002/0062882 A1 * | 5/2002 | Usui et al. ................ 148/220 |
| 2003/0051771 A1 | 3/2003 | Nishimori et al. |
| 2005/0051240 A1 * | 3/2005 | Takayama |

FOREIGN PATENT DOCUMENTS

| JP | 04-103752 | 4/1992 |
| JP | 05-331616 | 12/1993 |
| JP | 3395252 | 1/1995 |
| JP | 3381738 | 4/1995 |
| JP | 11-294476 | 10/1999 |
| JP | 2000-104749 | 4/2000 |
| JP | 2002-371320 | 12/2002 |
| JP | 2005-048292 | 2/2005 |
| JP | 2006-028541 | 2/2006 |

OTHER PUBLICATIONS

JIS G 4053 as filed Feb. 28, 2012 by the inventor.*
JIS G 0551 as filed Feb. 28, 2012 by the inventor.*
International Preliminary Report on Patentability and Written Opinion of the International Searching Authority mailed Sep. 11, 2009 for International Application No. PCT/JP2008/051230.
International Search Report mailed Mar. 4, 2008 for International Application No. PCT/JP2008/051230.

* cited by examiner

*Primary Examiner* — Gregory Binda
(74) *Attorney, Agent, or Firm* — Wenderoth, Lind & Ponack, L.L.P.

(57) ABSTRACT

In a constant velocity universal joint component and a manufacturing method thereof capable of achieving increased strength without significant procedural changes, and that can contribute to size reduction and weight reduction, a sharp-angled portion 15 is formed by machining after cold plastic working is applied. A carburization process is then performed in which surface carbon concentration of 0.45 mass % to less than 0.60 mass % is obtained. Quenching is then performed. High-frequency induction hardening is subsequently performed.

1 Claim, 6 Drawing Sheets

CONSTANT VELOCITY UNIVERSAL JOINT COMPONENT AND MANUFACTURING METHOD THEREOF

TECHNICAL FIELD

The present invention relates to a constant velocity universal joint component, such as a cage used in a constant velocity universal joint, and a manufacturing method thereof.

BACKGROUND ART

In a power transmission system of automobiles and various industrial machineries, a constant velocity universal joint connects a rotating shaft on a driving side and a rotating shaft on a driven side, and transmits torque at a constant speed. As a ball-type constant velocity universal joint using a ball that serves as a torque transmitting element, various types, such as a Birfield-type constant velocity universal joint (BJ), a double-offset type constant velocity universal joint (DOJ), and a Löbro-type constant velocity universal joint (LJ), are known. Six or eight torque transmitting balls are commonly used.

These constant velocity universal joints include an outer joint member, an inner joint member, torque transmitting balls, and a cage as main constituent elements. Track grooves that extend in an axial direction are formed on an inner circumferential surface of the outer joint member. Track grooves that extend in the axial direction are formed on an outer circumferential surface of the inner joint member. The rotating shaft on the driving side and the rotating shaft on the driven side are connected to the outer joint member and the inner joint member. A track groove on the outer joint member and a track groove on the inner joint member form a pair, and form a ball track. A torque transmitting ball is set on each ball track. The torque transmitting balls are housed within pockets formed in the cage in the circumferential direction and are held such as to roll freely.

In recent years, size reduction and weight reduction of such constant velocity universal joints are being achieved. However, the most difficult aspect of achieving size reduction and weight reduction of the constant velocity universal joint is maintaining sufficient strength at high operating angles. High angle strength is evaluated through quasi-static torsion testing performed on the constant velocity universal joint (Patent Document 1: Japanese Patent Laid-open Publication No. 2000-104749). Here, quasi-static torsion testing refers to a test for measuring breaking torque, in which toque is applied while the constant velocity universal joint is being rotated, taking into consideration actual vehicular conditions.

Quasi-static torsional strength is heavily dependent on strength of carburized components, such as the cage and the inner joint member. Thus, toughening the carburized components (particularly the cage) becomes an issue when achieving size reduction and weight reduction of the constant velocity universal joint. Therefore, in general, to manufacture the cage of the constant velocity universal joint, after cold plastic working is applied to a low carbon steel material (SCr 415), machining is performed. Carburizing and quenching is then performed, and finishing is performed (Patent Document 2: Japanese Patent Laid-open Publication No. Heisei 5-331616).

As a measure for increasing strength of carburized components, for example, a technique described in Patent Document 3 (Japanese Patent Laid-open Publication No. 2002-371320) is proposed. In other words, when a component on which cold plastic working has been applied is held at a high temperature for a long period of time, austenite grain coarsening occurs and strength is significantly reduced. Therefore, a special element is added to the material, thereby suppressing growth of austenite grains and increasing strength.

A processing method for improving strength is proposed (Patent Document 4: Japanese Patent Laid-open Publication No. 2005-48292) in which, after carburization to 0.6% to 0.9% carbon concentration, high-frequency hardening is performed, thereby reducing segregation of carbide and the like, and miniaturizing austenite grains (#10 or more).

Moreover, a technique is also proposed (Patent Document 5: Japanese Patent Publication No. 3381738) in which mechanical strength is increased by high-frequency hardening being performed after nitriding treatment. A technique is also proposed (Patent Document 6: Japanese Patent Publication No. 3395252) in which annealing is performed after carburization, and high-frequency hardening is performed on only the surface, thereby increasing strength.

SUMMARY OF THE INVENTION

Problems to be Solved by the Invention

As described above, toughening the carburized components (particularly the cage) becomes an issue when achieving size reduction and weight reduction of the constant velocity universal joint. However, when a special element is added to the material, thereby suppressing growth of austenite grains and increasing strength, as described in Patent Document 3, availability of special materials, such as Nb, Ti, and V, become a problem. Because segregation of P, S, carbide, and the like into grain boundaries as a result of carburization cannot be avoided, grain boundary fracture cannot be completely prevented. The cage is strongly cold-worked. Therefore, even when a special material, such as Nb, Ti, and V, is used, localized coarsening of crystal grains occurs during carburization heating. A mixed grain size state occurs in which fine grains and significantly coarse grains are mixed. Therefore, strength improvement cannot be expected.

The processing method described in Patent Document 4 is ineffective for constant velocity universal joint components, such as the cage, that includes a sharp-angled portion formed by cold plastic working and machining, In other words, in a component that has a sharp-angled portion, such as the cage, the surface of which is processed by carburization and quenching of a high concentration carbon, carbon concentration is higher at the sharp-angled portion, compared to flat portions. Cementite becomes segregated after quenching, thereby significantly reducing strength. Therefore, when stress is applied, yielding starts at low stress. Cracks form from the high-carbon, sharp-angled portion along the grain boundaries, causing brittle fracture.

Moreover, when high-frequency heating is performed on a component that has an interrupted shape, such as a window hole in a cage, the component is not evenly heated. Therefore, the component is required to be heated to quenching temperature by thermal diffusion. Thus, the heating temperature is required to be higher than an austenite transformation temperature. As a result, when the heating temperature during high-frequency hardening of the cage is locally just over the austenite transformation temperature, slack quenching occurs in a localized manner.

When high-frequency hardening is performed on medium carbon steel after nitriding treatment, thereby increasing mechanical strength, as described in Patent Document 5, compared to case hardened steel obtained by carburization (C: 0.10 mass % to 0.20 mass %; SCr 415, SCr 420, and the like), the medium carbon steel has a higher carbon content. Therefore, when cold plastic working is applied, deformability decreases, causing problems such as cracks in the product and decreased die life. Regarding the technique described in Patent Document 6, an ordinary amount of carburization is performed during carburization. Therefore, grain boundaries cannot be sufficiently strengthened. The technique is insufficient for achieving increased strength in a component having a sharp-angled portion.

In light of the above-described issues, the present invention provides a constant velocity universal joint component and a manufacturing method thereof capable of achieving increased strength without significant procedural changes in a conventional carburized and quenched component, and that can contribute to size reduction and weight reduction.

Means for Solving the Problems

A constant velocity universal joint component of the present invention is a carburized component used in a constant velocity universal joint. In the constant velocity universal joint component, a sharp-angled portion is formed by machining, after cold plastic working is applied. The constant velocity universal joint component uses case hardened steel and has a surface on which a carburized layer of 0.45 mass % to less than 0.60 mass % is formed by a short-period secondary quenching process being performed after carburization and quenching. Mixed grains including prior austenite grains are not formed in the constant velocity universal joint component. Here, case hardened steel refers to steel that is equivalent to JIS G 4104 and 4105 (i.e., JIS G 4053). Mixed grains including prior austenite grains refers to inclusion of crystal grains belonging to two or more different granularity (number) series, with reference to JIS G 0551.

Because low-carbon carburization is performed on the constant velocity universal joint component the present invention, segregation of carbide into grain boundaries and high carbonization of the sharp-angled portion are suppressed. Moreover, formation of mixed grains during carburization is improved as a result of the short-period secondary quenching by high-frequency induction heating. Strength can be significantly improved. In other words, the present invention is an invention that increases strength of a constant velocity universal joint component having a sharp-angled portion.

A first manufacturing method of a constant velocity universal joint component of the present invention is a method for manufacturing a constant velocity universal joint component having a sharp-angled portion, in which the sharp-angled portion is formed by machining after cold plastic working is applied. A carburization process is then performed in which surface carbon concentration of 0.45 mass % to less than 0.60 mass % is obtained. Quenching is then performed. High-frequency induction hardening is subsequently performed.

Because low-carbon carburization is performed in the first manufacturing method of a constant velocity universal joint component of the present invention, segregation of carbide into grain boundaries is suppressed. Coarsening during carburization is improved as a result of secondary quenching by high-frequency induction heating.

A second manufacturing method of a constant velocity universal joint component of the present invention is a method for manufacturing a constant velocity universal joint component having a sharp-angled portion, in which the sharp-angled portion is formed by machining after cold plastic working is applied. A carburization process is then performed in which surface carbon concentration of 0.45 mass % to less than 0.60 mass % is obtained. Annealing is then performed to an $A_{r1}$ point or lower. A bainitic structure, a normal structure, or a combined structure of the bainitic structure and the normal structure is then formed. High-frequency induction hardening is subsequently performed.

In the second manufacturing method of a constant velocity universal joint component of the present invention, annealing is performed after carburization, and a bainitic structure, a normal structure, or a combined structure of the bainitic structure and the normal structure is formed. Therefore, heat treatment deformation after high-frequency hardening can be reduced. In other words, compared to when quenching is performed after carburization, cooling is performed more evenly when annealing is performed. Therefore, thermal strain is small Although the thermal strain is released by subsequent high-frequency heating and causes deformation, because the thermal strain is small, deformation after high-frequency hardening is small.

A third manufacturing method of a constant velocity universal joint component of the present invention is a method for manufacturing a constant velocity universal joint component having a sharp-angled portion, in which the sharp-angled portion is formed by machining after cold plastic working is applied. A carburization process is then performed in which surface carbon concentration of 0.45 mass % to less than 0.60 mass % is obtained. Isothermal transformation is then performed at a temperature of $A_{r1}$ point or lower. High-frequency induction hardening is subsequently performed.

In the third manufacturing method of a constant velocity universal joint component of the present invention, isothermal transformation is performed at a temperature of $A_{r1}$ point or lower, and high-frequency induction hardening is subsequently performed. Therefore, deformation after high-frequency hardening is further reduced.

Advantage of the Invention

In the constant velocity universal joint component of the present invention, a low-concentrate carburized layer is formed on the surface. Segregation of carbide into the grain boundaries and high carbonization of the sharp-angled portion are suppressed. Moreover, formation of mixed grains during carburization is improved as a result of the short-period secondary quenching by high-frequency induction heating. Therefore, new fine grain boundaries with high cleanliness are formed over the overall cross-section, further increasing strength. Therefore, size reduction of a constant velocity universal joint using the manufactured constant velocity universal joint component can be achieved. Moreover, the manufactured constant velocity universal joint component has superior strength, even when its shape is the same as that of a conventionally pre-existing component. Therefore, through use of the manufactured constant velocity universal joint component having the same shape as that of the conventional component, a constant velocity universal joint of the same size and having the same shape as the conventional constant velocity universal joint can be configured using conventional pre-existing components (parts) for other components. In this way, in the present invention, strength can be increased in the carburized component that is the component with the weakest joint high-angle strength. The joint can be made more compact. Because the component has the same shape as that of the conventional component, strength can be increased without requiring significant procedural changes. In particular, because size reduction can be achieved, the present invention can contribute to cost reduction and increased fuel efficiency of vehicles.

Because low-carbon carburization is performed in the first manufacturing method of a constant velocity universal joint component of the present invention, segregation of carbide into grain boundaries is suppressed. Coarsening during carburization is improved as a result of short-period secondary quenching by high-frequency induction heating. Therefore, new grain boundaries with high cleanliness are formed over the overall cross-section, further increasing strength.

Because low-carbon carburization is performed in the second manufacturing method of a constant velocity universal joint component of the present invention as well, segregation of carbide into grain boundaries and high carbonization of the sharp-angled portion are suppressed. Coarsening during carburization is improved as a result of short-period secondary quenching by high-frequency induction heating. Therefore, effects similar to those achieved by the first manufacturing method of a constant velocity universal joint component can be achieved. Moreover, because quenching is performed after carburization, deformation after high-frequency hardening is small. A high-quality constant velocity universal joint component can be manufactured.

Because low-carbon carburization is performed in the third manufacturing method of a constant velocity universal joint component of the present invention as well, segregation of carbide into grain boundaries and high carbonization of the sharp-angled portion are suppressed. Coarsening during carburization is improved as a result of secondary quenching by high-frequency induction heating. Therefore, effects similar to those achieved by the first manufacturing method of a constant velocity universal joint component can be achieved. Moreover, because isothermal transformation is performed at a temperature of $A_{r1}$ point or lower, and high-frequency induction hardening is subsequently performed, deformation after high-frequency hardening is further reduced. A high-quality constant velocity universal joint component can be manufactured.

DETAILED DESCRIPTION OF THE INVENTION

Embodiments of the present invention will be described below with reference to FIG. 1 to FIG. 7.

Figure 1:
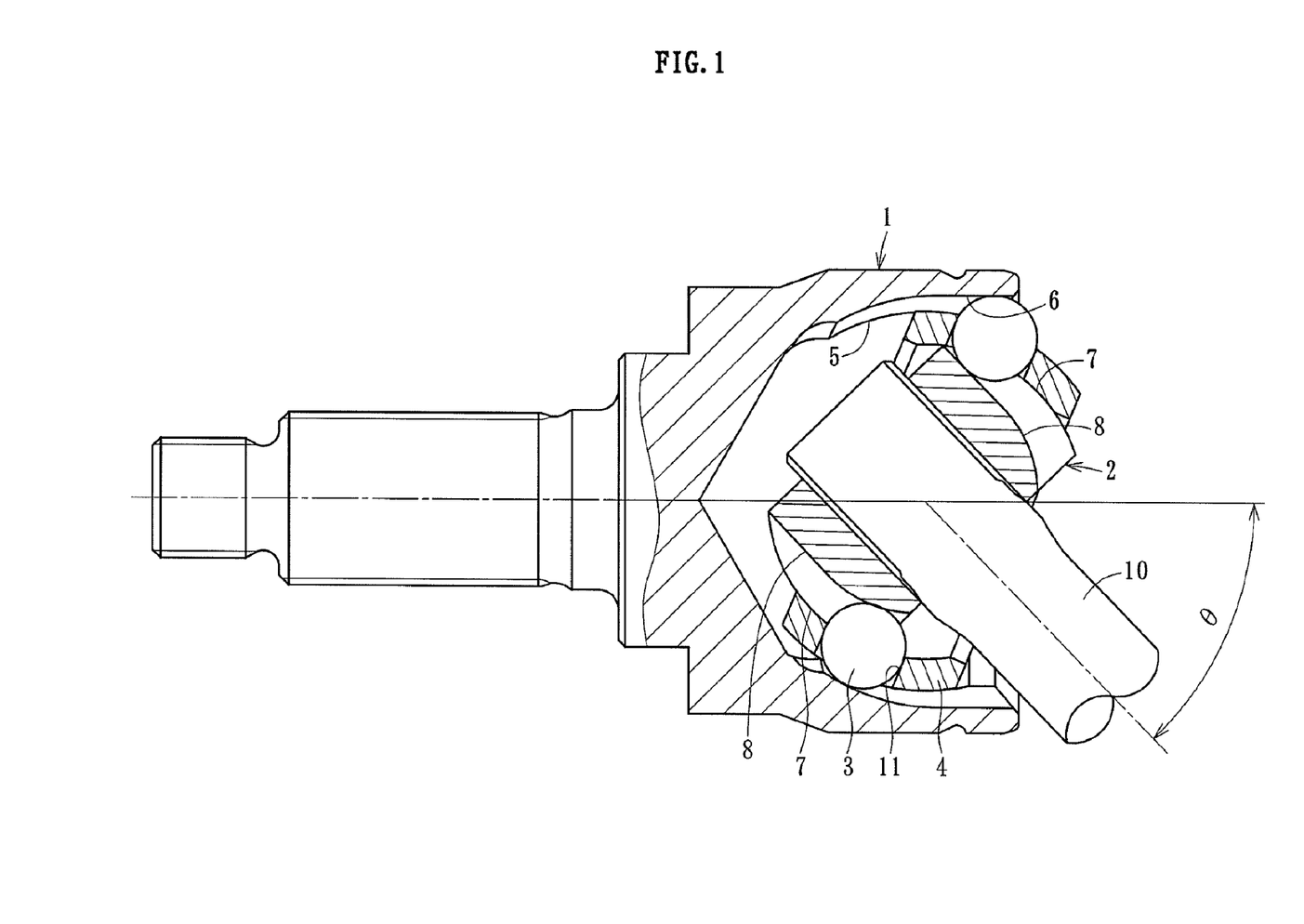
FIG. 1 is a cross-sectional view of a constant velocity universal joint using a component manufactured by a manufacturing method of a constant velocity universal joint component according to an embodiment of the present invention.

FIG. 1 is a diagram of a constant velocity universal joint that uses a constant velocity universal joint component (in this instance, a cage) manufactured by a manufacturing method of a constant velocity universal joint component of the present invention. The constant velocity universal joint includes an outer joint member 1 serving as an outer joint member, an inner joint member 2 serving as an inner joint member, torque transmitting balls 3, and a cage 4, as main constituent elements.

Track grooves 6 that extend in an axial direction are formed on an inner circumferential surface (inner diameter surface) 5 of the outer joint member 1. Track grooves 8 that extend in the axial direction are formed on an outer circumferential surface 7 of the inner joint member 2. A track groove 6 of the outer joint member 1 and a track groove 8 of the inner joint member 2 form a pair, and form a ball track. A torque transmitting ball 3 is set on each ball track. The toque transmitting balls 3 are housed within pockets 11 formed on the cage 4 in the circumferential direction, and held such as to roll freely. A shaft 10 is fitted into a center hole of the inner joint member 2.

Figure 2:
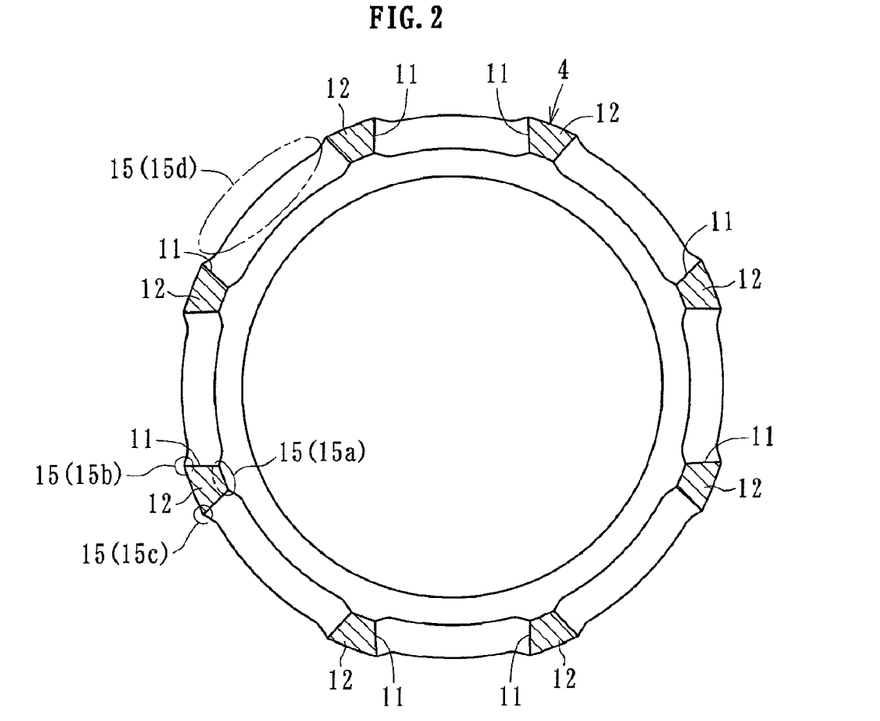
FIG. 2 is a cross-sectional view of a cage that is the constant velocity universal joint component.
Figure 3:
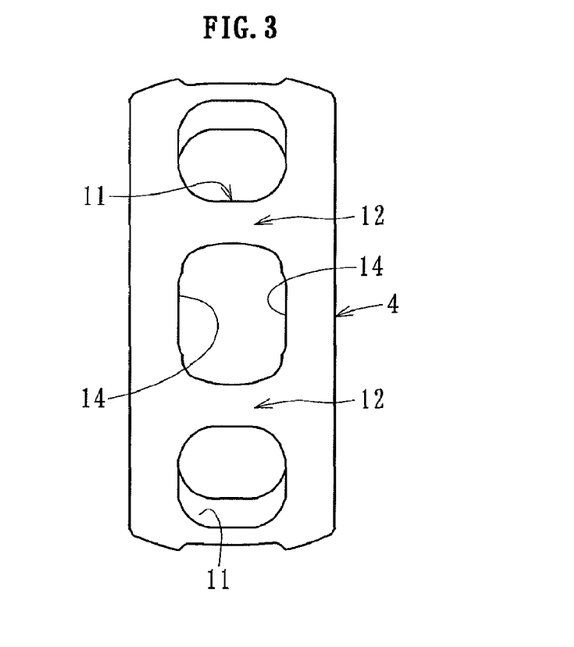
FIG. 3 is a side view of the cage that is the constant velocity universal joint component.

As shown in FIG. 2 and FIG. 3, eight pockets 11 are formed on the cage 4 at a predetermined pitch (45-degree pitch in FIG. 2 and FIG. 3) along the circumferential direction. Therefore, columnar sections 12 are formed between adjacent pockets 11 along the circumferential direction (in this instance, eight columnar sections 12).

As shown in FIG. 2, the cage 4 is formed having sharp-angled portions in areas indicated by 15a, 15b, 15c, and the like in each columnar section 12. A sharp-angled portion is formed in an area indicated by 15d and the like in each pocket 11

In the constant velocity universal joint component, the sharp-angled portion is formed by machining, after cold plastic working is applied. The constant velocity universal joint component uses case hardened steel and has a surface on which a carburized layer of 0.45 mass % to less than 0.60 mass % is formed by a short-period secondary quenching process being performed after carburization and quenching. Mixed grains including prior austenite grains are not formed in the constant velocity universal joint component. Here, case hardened steel refers to steel that is equivalent to JIS G 4104 and 4105. Mixed grains including prior austenite grains refers to inclusion of crystal grains belonging to two or more different granularity (number) series, with reference to JIS G 0551.

Next, a manufacturing method of a cage 4 configured as described above will be described. First, a steel pipe (such as SCr 415) is cut to a predetermined length. The steel pipe is then upset by a press, and expanded into a spherical shape. Inner and outer surfaces, and end faces of the upset formed and fabricated material having the short, spherical shape are cut, forming a material having a spherical outer surface and a spherical inner surface. Next, the material is formed by a press procedure in which the material is punched by a press, thereby forming the plurality of pockets 11 in the circumferential direction of the material. A shaving procedure is performed in which a pair of side surfaces 14 and 14 of the pocket 11, opposing each other in an axial direction of the cage 4, is cut. In other words, cold plastic working is applied to the material, and the sharp-angled portions are formed by machining.

A quench hardening process is subsequently performed. In this instance, quenching is performed after a carburization process is performed in which surface carbon concentration of 0.45 mass % to less than 0.60 mass % is obtained. High-frequency induction hardening is then performed. Here, the carburization process refers to a process in which steel is heated in a carburizing agent, such as a gas, liquid, or solid that includes a large amount of carbon, thereby impregnating the steel with carbon from the surface layer. A vacuum carburization device or a plasma carburization device can be used for the carburization process. Softening characteristic of the surface can be further improved by ammonia gas being applied and nitrogen being dispersed during carburization and quenching.

High-frequency induction hardening refers to hardening in which the component (in this instance, the cage) is placed between coils through which high-frequency current flows. The component is heated by Joule heat that accompanies an eddy current generated on the surface. A finishing process, such as turning and grinding, is subsequently performed as required, thereby resulting in a finished product.

Because low-carbon carburization is performed in the present invention, segregation of carbide into grain boundaries is suppressed. Moreover, coarsening during carburization is improved as a result of the short-period secondary quenching by high-frequency induction heating. Because new grain boundaries with high cleanliness are formed over the overall cross-section as a result, strength can be further increased. Therefore, size reduction of the constant velocity universal joint using the manufactured constant velocity universal joint component can be achieved. Moreover, the manufactured constant velocity universal joint component has superior strength, even when its shape is the same as that of a conventionally pre-existing component. Therefore, through use of the manufactured constant velocity universal joint component having the same shape as that of the conventional component, a constant velocity universal joint of the same size and having the same shape as the conventional constant velocity universal joint can be configured using conventional pre-existing components (parts) for other components. In this way, in the present invention, strength can be increased in the carburized component that is the component with the weakest joint high-angle strength. The joint can be made more compact. Because the component has the same shape as that of the conventional component, strength can be increased without requiring significant procedural changes. In particular, because size reduction can be achieved, the present invention contributes to cost reduction and increased fuel efficiency of vehicles.

According to another embodiment of the present invention, the sharp-angled portion is formed by machining after cold plastic working is applied. Then, after the carburization process is performed in which surface carbon concentration of 0.45 mass % to less than 0.60 mass % is obtained, the component is annealed to an $A_{r1}$ point or lower, forming a bainitic structure. High-frequency induction hardening is subsequently performed.

Bainite refers to a cooling transformation product of austenite formed at a temperature range halfway between a formation temperature ($A_{r1}$) of pearlite and a formation temperature (Ms point) of martensite. Therefore, the material is merely required to be quenched in a heat bath a temperature halfway between $A_{r1}$ and Ms transformation points, causing isothermal transformation.

In this way, as a result of annealing after carburization and formation of the bainitic structure, heat-treatment deformation after high-frequency hardening can be reduced. In other words, as a result of annealing after carburization, thermal strain is small because annealing allows cooling to be performed more evenly. The thermal strain is released by subsequent high-frequency heating, causing deformation. However, because the thermal strain is small, deformation after high-frequency hardening is small.

Instead of the bainitic structure being formed, a normal structure can be formed, or a combined structure of the bainitic structure and the normal structure can also be formed. Here, the normal structure refers to a structure formed almost in accordance with an equilibrium diagram after annealing (such as air-cooling) from an austenite state.

In this way, heat-treatment deformation after high-frequency hardening can be reduced can be reduced even when the normal structure or the combined structure of the bainitic structure and the normal structure is formed.

According to another embodiment of the present invention, after the carburization process is performed in which surface carbon concentration of 0.45 mass % to less than 0.60 mass % is obtained, isothermal transformation is performed at a temperature of $A_{r1}$ point or lower. High-frequency induction hardening is subsequently performed.

In this way, as a result of the high-frequency induction hardening being performed after isothermal transformation performed at a temperature of $A_{r1}$ point or lower, heat-treatment deformation after high-frequency hardening can be further reduced.

Embodiments of the present invention are described above. However, the present invention is not limited to the above-described embodiments. Various modifications can be made. For example, the present invention can be applied to the inner joint member, the outer joint member, and the like, in addition to constant velocity universal joint components. When the constant velocity universal joint component is the cage, the number of pockets is not limited to eight pockets. The number of pockets can be arbitrarily increased and decreased. However, providing six or eight pockets is effective in reducing ball PCD and achieving compactness.

Examples

Next, an example will be described. Cages (samples 1 to 6 and a conventional cage) were manufactured using SCr415 as the material (main chemical components being 0.16C-0.20Si-0.7Mn-0.02P-0.025S-1.0Cr.). The cages were set in the constant velocity universal joint shown in FIG. 1, and quasi-static torsion testing was performed. Aspects of each sample and the conventional cage are shown in Table 1, below. In Table 1, CPc value indicates a carbon potential during carburization. CPd value indicates carbon potential during a carburization-diffusion process. TIQ indicates a high-frequency heating temperature. In Table 1, samples 2, 3, and 4 correspond to the present invention. The cage in the "carburization and quenching only" column corresponds to the conventional cage. Samples 1, 5, and 6 correspond to comparison cages.

TABLE 1

|  | High-frequency hardening after carburization | | | | | | Carburization and quenching only |
|---|---|---|---|---|---|---|---|
|  | Present invention | | | | | | Carburization |
| Sample No. | 1 | 2 | 3 | 4 | 5 | 6 | process |
| CPc value (%) | 1.0 | 1.0 | 1.0 | 1.0 | 1.2 | 1.3 | 1.3 |
| CPd value (%) | 0.4 | 0.45 | 0.51 | 0.6 | 0.7 | 0.9 | 0.9 |
| TIQ (° C.) | 950 | Same as sample 1 | Same as sample 1 | Same as sample 1 | Same as sample 1 | Same as sample 1 |  |
| Surface hardness (HRc) | 56 | 58 | 59 | 62 | 62 | 62 | 61 |
| Core hardness (HRc) | 42 | 43 | 42 | 42 | 43 | 42 | 38 |
| Prior austenite granularity No. | 11 | 11 | 10 | 11 | 10 | 10 | 8 |
| Mixed grains including prior austenite grains | None | ← | ← | ← | ← | ← | Present |

Figure 4:
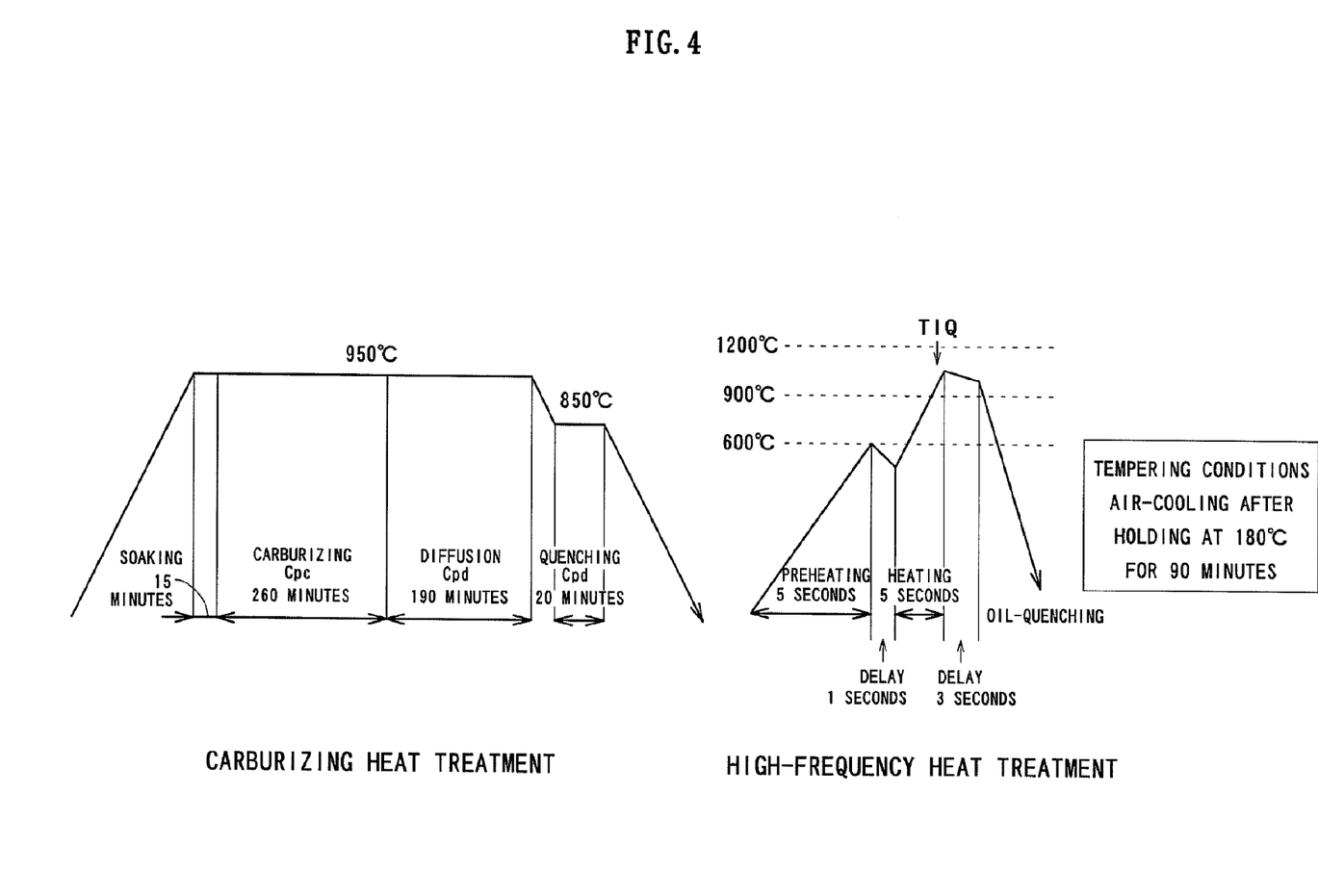
FIG. 4 is a graph showing heat treatment conditions of the manufacturing method of the constant velocity universal joint component.
Figure 5:
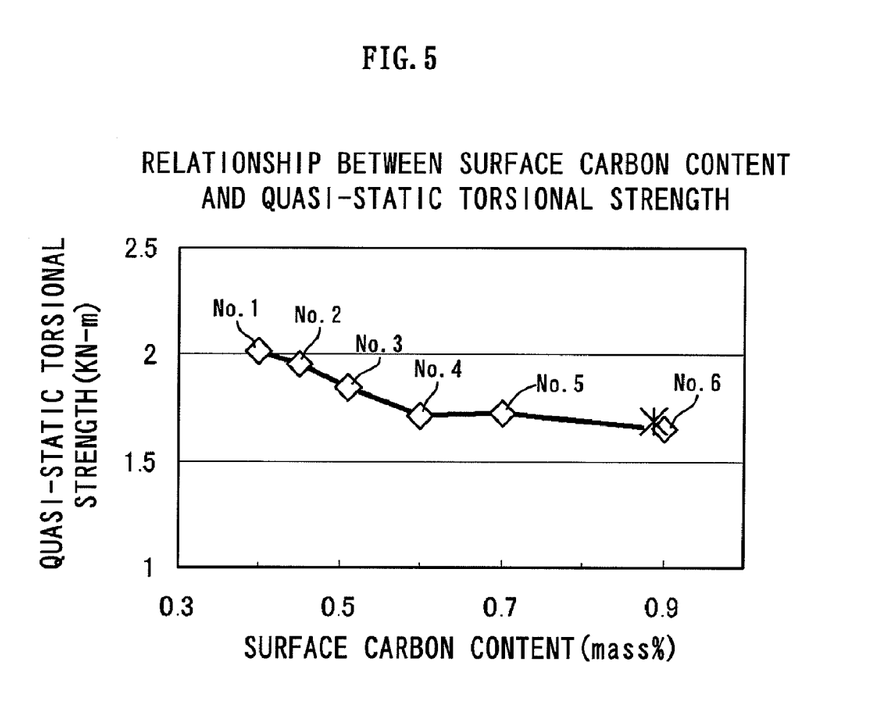
FIG. 5 is a graph showing a relationship between surface carbon content and quasi-static torsional strength of the constant velocity universal joint component.
Figure 8:
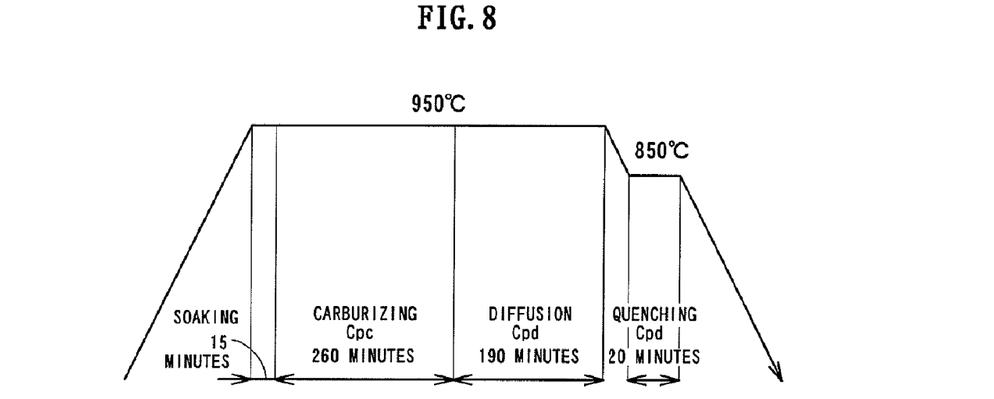
FIG. 8 is a graph showing conventional heat treatment conditions.
Figure 9:
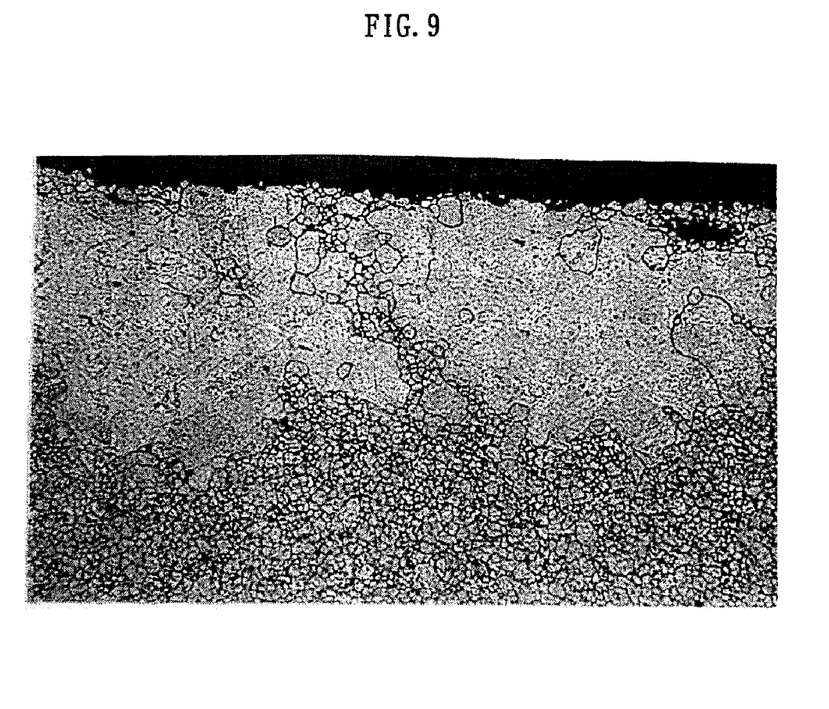
FIG. 9 is a microscopic photograph of prior austenite grains of the conventional product.
Figure 10:
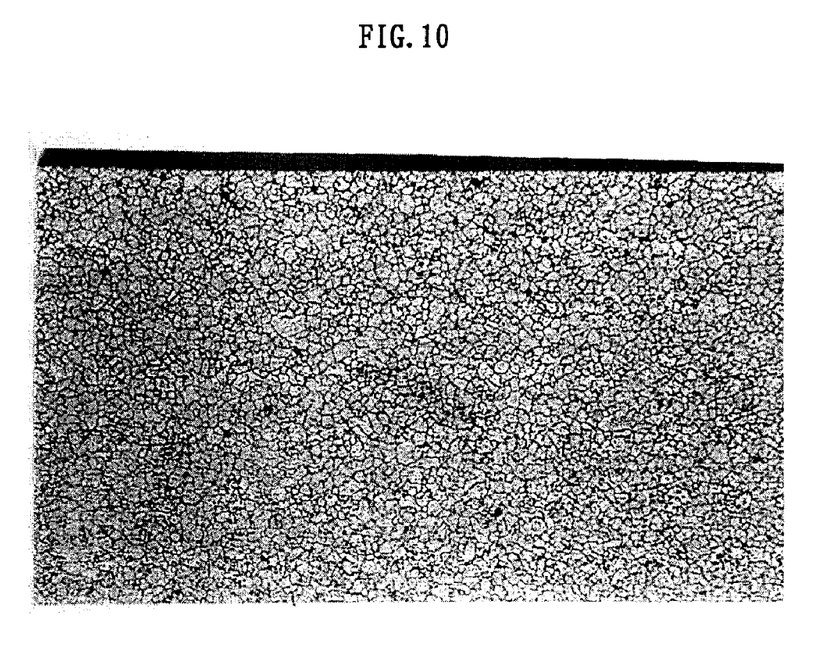
FIG. 10 is a microscopic photograph of prior No. 3 austenite grains of an example.

FIG. 8 shows heat treatment conditions of the conventional cage. FIG. 4 shows heat treatment conditions of the samples 1 to 6. A high-frequency heating device is used that heats the cage from its outer periphery at a frequency of 10 kHz and an output of 10 kW. Results of the quasi-static torsion testing are shown in FIG. 5. FIG. 5 clearly indicates that strength significantly increases when carbon content drops below 0.6 mass %. In FIG. 5, No. 1 diamond indicates the sample 1, No. 2 diamond indicates the sample 2, No. 3 diamond indicates the sample 3, No. 4 diamond indicates the sample 4, No. 5 diamond indicates the sample 5, and No. 6 diamond indicates the sample 6. An asterisk indicates the conventional cage. The quasi-static torsion testing refers to a test for measuring breaking torque, in which toque is applied while the constant velocity universal joint is being rotated, taking into consideration actual vehicular conditions. FIG. 9 indicates a state of prior austenite grains of the conventional carburized product. FIG. 10 indicates a state of prior No. 3 austenite grains of the present invention. In this way, coarsening cannot be seen in the sample cages of the present invention.

Figure 6:
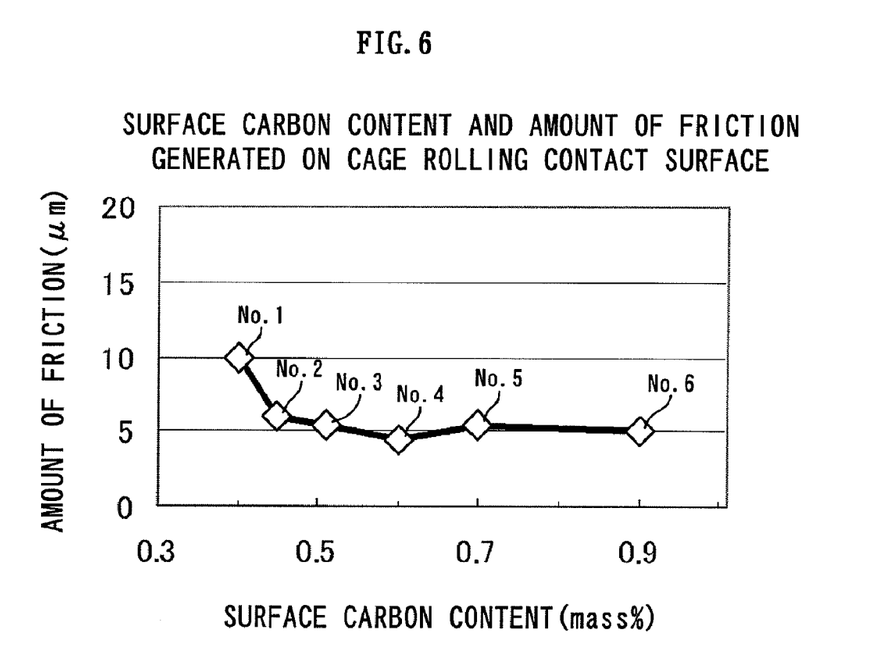
FIG. 6 is a graph showing a relationship between the surface carbon content and an amount of friction generated on a cage rolling contact surface of the constant velocity universal joint component.

An amount of friction generated at a ball contacting section of the cage was measured after the cage had been operated for 100 hours at an angle of 8 degrees, a rotation frequency of 1500 rpm, and under a track surface pressure of 1.5GPa. Results are shown in FIG. 6. FIG. 6 clearly indicates that the amount of friction generated on the cage increases at 0.45 mass %. Therefore, the surface carbon content obtained by carburization is preferably 0.45 mass % to less than 0.6 mass %. In FIG. 6 as well, the No. 1 diamond indicates the sample 1, the No. 2 diamond indicates the sample 2, the No. 3 diamond indicates the sample 3, the No. 4 diamond indicates the sample 4, the No. 5 diamond indicates the sample 5, and the No. 6 diamond indicates the sample 6.

Figure 7:
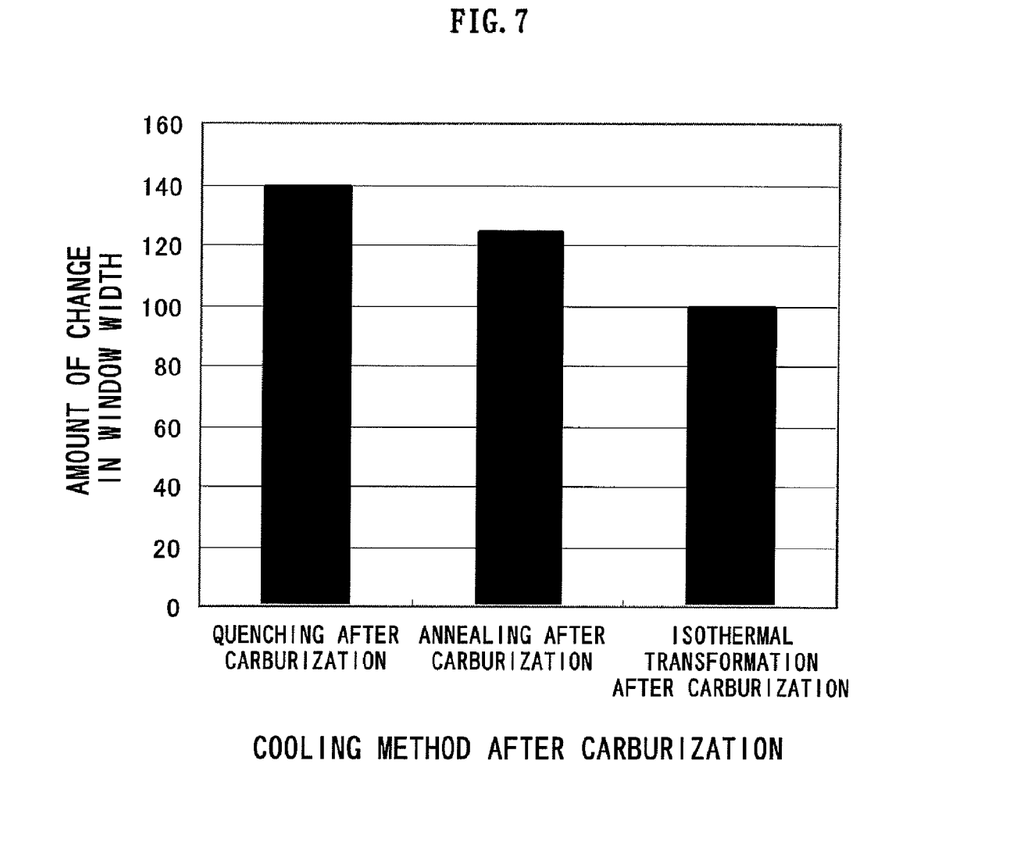
FIG. 7 is a graph of an amount of change in window width of the cage that is the constant velocity universal joint component.

A cage that has only undergone carburization and quenching, a cage that has been annealed after carburization and has subsequently undergone high-frequency hardening, and a cage that has been held at a constant temperature for 30 minutes in a 350 degree salt bath after carburization and has subsequently been air-cooled and undergone high-frequency hardening were experimentally manufactured. Conditions under which carburization and high-frequency hardening were performed are the same as those for the sample 4. An amount of change in the width of the window (pocket) was measured for the above-described three types of cages. The amount of change in each cage is shown in FIG. 7, the amount of change in the cage held at the constant temperature being 100. As shown in FIG. 7, the amount of change in the cage that has been annealed after carburization is about 125. The amount of change in the cage that has been quenched after carburization is about 140. It is clear that, compared to the cage that has been held at the constant temperature, the amount of change in the window width is significant in the other cages.

The invention claimed is:
1. A manufacturing method of a constant velocity universal joint component, said method comprising:
    forming the component by machining after cold plastic working is applied;
    after said forming of the component, performing a carburization process in which a surface carbon concentration of 0.45 mass % to less than 0.60 mass % is obtained in a surface of the component;
    quenching the component after said performing of the carburization process; and
    after said quenching, performing induction hardening of the component.

* * * * *